(12) United States Patent
Fonseca

(10) Patent No.: US 8,384,594 B2
(45) Date of Patent: Feb. 26, 2013

(54) CLOSED SHAPE BEAM FORMING NETWORK

(75) Inventor: Nelson Fonseca, Cugnaux (FR)

(73) Assignee: Centre National d'Etudes Spatiales (FR)

(*) Notice: Subject to any disclaimer, the term of this patent is extended or adjusted under 35 U.S.C. 154(b) by 158 days.

(21) Appl. No.: 12/851,859

(22) Filed: Aug. 6, 2010

(65) Prior Publication Data
US 2011/0050498 A1  Mar. 3, 2011

(30) Foreign Application Priority Data
Aug. 7, 2009 (EP) .................................. 09305743

(51) Int. Cl.
*H01Q 3/00* (2006.01)
(52) U.S. Cl. ........................................................ 342/373
(58) Field of Classification Search .............. 342/81,
342/157, 368, 373; 343/853; 333/100, 106
See application file for complete search history.

(56) References Cited

U.S. PATENT DOCUMENTS

| | | |
|---|---|---|
| 3,573,837 A | 4/1971 | Reindel |
| 3,653,057 A | 3/1972 | Charlton |
| 3,868,695 A | 2/1975 | Kadak |
| 4,316,192 A | 2/1982 | Acoraci |
| 5,028,930 A | 7/1991 | Evans |

OTHER PUBLICATIONS

European Search Report, EP 09305743, dated Dec. 1, 2009.
Betancourt D et al: "A Novel Methodology to Feed Phased Array Antennas" IEEE Transactions on Antennas and Propagation, IEEE Service Center, Piscataway, NJ, US, vol. 55, No. 9, Sep. 1, 2007, pp. 2489-2494, XP011191432.
Betancourt D., Del Rio C.: "A beamforming network for multibeam antenna arrays based on coherent radiating periodic structures" IET Seminar Digest—2nd European Conference on Antennas ANO Propagation, EUCAP 2007, vol. 2007, No. 11961, Nov. 11, 2007-Nov. 16, 2007 XP002558001.

*Primary Examiner* — Dao Phan
(74) *Attorney, Agent, or Firm* — Lerner, David, Littenberg, Krumholz & Mentlik, LLP

(57) ABSTRACT

A network distributes input microwave signals into a output signals having a Gaussian amplitude and in-phase distribution per the input signal. The network includes N input ports providing N different input signals; M output ports, M being a multiple of N; and layers disposed between the inputs ports and the outputs ports. The input signals are distributed through the layers. Each layer includes an arrangement of power combiners and/or power dividers. The arrangement has an angular rotational configuration of $k2\pi/N$ radians around a symmetry symmetrical axis of a closed polygonal shape formed by the input ports, where k is an integer between 1 and N.

19 Claims, 8 Drawing Sheets

FIG. 3
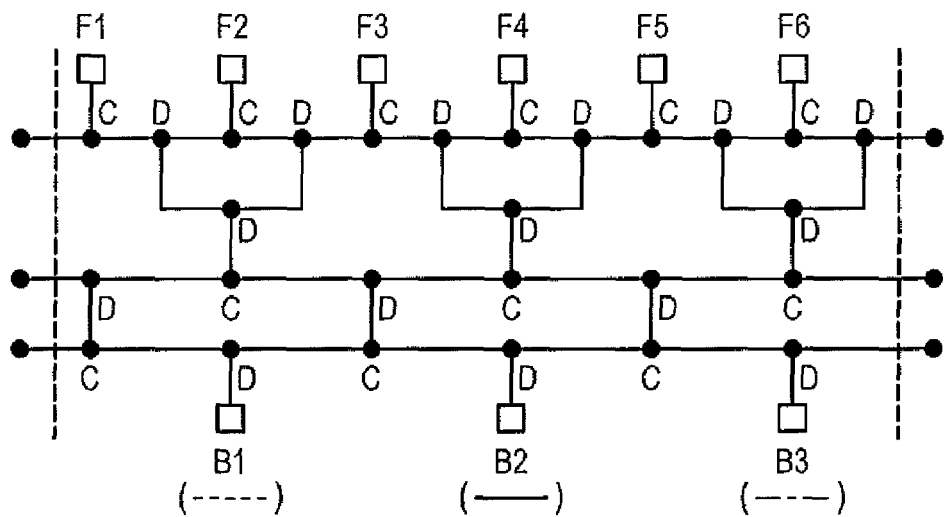
FIG. 4
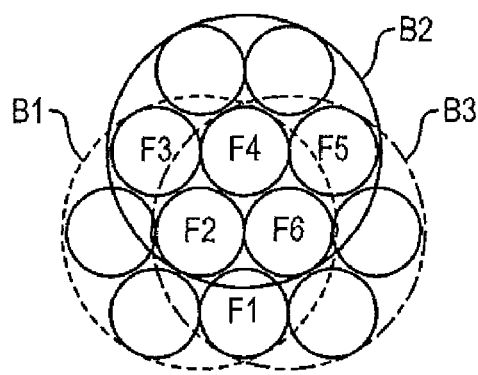
FIG. 5
|    | B1     | B2     | B3     |
|----|--------|--------|--------|
| F1 | -11.56 | -15.08 | -11.56 |
| F2 | -9.06  | -15.08 | -15.08 |
| F3 | -11.56 | -11.56 | -15.08 |
| F4 | -15.08 | -9.06  | -15.08 |
| F5 | -15.08 | -11.56 | -11.56 |
| F6 | -15.08 | -15.08 | -9.06  |

|    | B1    | B2    | B3    |
|----|-------|-------|-------|
| F1 | -1.42 | -     | -6.42 |
| F2 | -1.42 | -6.05 | -     |
| F3 | -6.05 | -1.42 | -     |
| F4 | -     | -1.42 | -6.42 |
| F5 | -     | -6.05 | -1.42 |
| F6 | -6.05 | -     | -1.42 |

FIG. 9

|  | B1 | B2 | B3 | B4 | B5 |
|---|---|---|---|---|---|
| F1 | -1.42 | - | - | - | -6.05 |
| F2 | -1.42 | -6.05 | - | - | - |
| F3 | -6.05 | -1.42 | - | - | - |
| F4 | - | -1.42 | -6.05 | - | - |
| F5 | - | -6.05 | -1.42 | - | - |
| F6 | - | - | -1.42 | -6.05 | - |
| F7 | - | - | -6.05 | -1.42 | - |
| F8 | - | - | - | -1.42 | -6.05 |
| F9 | - | - | - | -6.05 | -1.42 |
| F10 | -6.05 | - | - | - | -1.42 |

CLOSED SHAPE BEAM FORMING NETWORK

CROSS REFERENCE TO RELATED APPLICATIONS

The present application claims the benefit of European Patent Application No. 09305743.8, filed Aug. 7, 2009, the disclosure of which is hereby incorporated herein by reference.

FIELD OF THE INVENTION

The invention relates to a device for distributing a plurality of microwave signals between radiating elements of an array antenna, and more particularly it applies to beam forming network in direct radiating antennas or array fed reflector antennas.

BACKGROUND OF THE INVENTION

Beam Forming Network (BFN) is a major sub-system of array antennas working in the microwave or millimetre-wave frequency range and numerous configurations are known.

In the following description we consider the BFN in transmit, meaning that it provides power to the array antenna. Obviously, the same BFN could be used in receive, based on the reciprocity principle.

For multiple beam applications, the BFN can be either orthogonal or coherent (in-phase).

Orthogonal BFNs such as Butler matrices (see J. Butler and R. Lowe, "*Beam-Forming Matrix Simplifies Design of Electronically Scanned Antennas*", Electronic Design pp 170-173, April 1961) Nolen matrices (see J. C. Nolen, "*Synthesis of Multiple Beam Networks for Arbitrary Illuminations*", PhD Thesis, Bendix Corporation, Radio Division, Baltimore, 21 Apr. 1965), etc. are interesting as they are lossless but this property imposes strong constraints on the amplitude and phase of the signals feeding the array.

For some applications, it may be convenient to have some control on the amplitude and/or phase. In this case, we prefer to use coherent (in-phase) BFNs associated to phase-shifters and eventually attenuators as described in document U.S. Pat. No. 3,868,695.

Document U.S. Pat. No. 3,868,695 describes a coherent BFN wherein each input is associated to one of the N beams produced by the array. The input power is divided into M signals of equal amplitude and phase corresponding to the number of radiating elements. A matrix of N×M amplitude and phase controls can be implemented to modify the characteristics of any signal. Then a combination network is used to direct the N signals towards the corresponding radiating element. The losses come mainly from this combination network as the combined signals have usually different frequencies. If tapered excitation laws are required to reduce side lobe levels, further losses must be added with attenuators at the amplitude and phase controls level. The combination and division networks are planar. All the combination networks (respectively division networks) are parallel to each other and orthogonal to all the division networks (respectively combination networks).

Recently, another coherent BFN has been introduced in the literature: the Coherently Radiating Periodic Structure (CORPS) BFN (see D. Betancourt and C. Del Rio, "*A Beamforming Network for Multibeam Antenna Arrays Based on Coherent Radiating Periodic Structures*", EuCAP 2007, 11-16 Nov. 2007). It is inspired by the binomial excitation law in the case of mono-beam applications. In the case of multiple beam applications, the excitation law in amplitude is better described by a Gaussian tapering that highly depends on the number of layers. This natural amplitude tapering is interesting to reduce side lobe level and as a consequence interferer level in multiple beam applications with frequency reuse (SDMA).

FIG. 1 illustrates a CORPS BFN producing 3 beams and comprising 3 input ports (one port per beam), 5 output ports (3 per input port) and 2 layers, each layer comprising an alternate arrangement of power dividers (D) and power combiners (C). In this figure, the electrical paths followed by the signal entering at input port 2 are highlighted. With the configuration of FIG. 1 we can see how signals overlap at the output ports: some outputs only receive one of the input signals while some others combine 2 or even 3 input signals (see the curves represented at the top of FIG. 1 and illustrating the Gaussian amplitude distribution provided by the network).

The design of FIG. 1 may be of interest for an array in front of a parabolic reflector as the electromagnetic field amplitude localization in the focal plane directly impacts on the beam pointing direction, although in some cases we need similar overlaps between all the signals that are not possible with this planar configuration. In fact we see in FIG. 1 that the signals $B_1$ and $B_2$ in one hand and $B_2$ and $B_3$ one the other hand overlap in a similar way, but it is not the case of $B_1$ and $B_3$.

Furthermore, for conformal direct radiating arrays (DRA) applications like circular, cylindrical or conical array antennas, it may be also of interest to keep similar overlaps between adjacent input signals in multiple beam configurations that are also not accessible with this planar implementation.

In the specific case of circular arrays, this problem may be partially overcome with the architectures described in documents U.S. Pat. No. 3,573,837 and U.S. Pat. No. 4,316,192. First configuration enables one beam to be steered by simply switching between the different radiating elements of a circular array. The implementation of this solution for multiple beam applications becomes quickly complex. The second solution is quite similar except that the amplitude of the signals feeding the circular array is controlled by the combination of a Butler matrix and a row of phase shifters. This also leads to a quite complex structure that is usually preferred for a limited number of beams to be steered.

SUMMARY OF THE INVENTION

The aim of the invention is to provide a device that produces output signals that have similar overlap between adjacent signals.

According to a first aspect, the invention concerns a network for distributing a plurality of input microwave signals into a plurality of output signals having a Gaussian amplitude and in-phase distribution per said input signal, the network comprising: a plurality of N input ports receiving N different input signals; a plurality of M output ports, M being a multiple number of N; a plurality of P layers disposed between the input ports and the output ports, the input signals being distributed through these layers, each layer comprising an arrangement of power combiners and/or power dividers, the arrangement is self similar with an angular rotation of $k2\pi/N$ radian around the symmetry axis of the polygonal closed shape formed by said input ports, k being an integer comprised between 1 and N.

The network according to the first aspect of the invention can have one of the following features:

each input port is connected to a power divider and each output port is connected to a power combiner;

at least two successive layers are connected so that a power divider of a layer is connected to a power combiner of the previous and/or the following layer;

at least two successive layers are connected so that a power divider of a layer is connected to a power divider of the previous and/or the following layer;

at least two successive layers are connected so that a power combiner of a layer is connected to a power combiner of the previous and/or the following layer;

it comprises P=3 layers, the layer connected to the input ports being only constituted by power dividers, the two other layers being constituted by an alternate arrangement of power combiners and power dividers;

It comprises P=4 layers, the layers connected to the input ports and the outputs ports as well as the layer connected to the layer connected itself to input ports being constituted by an alternate arrangement of power combiners and power dividers, the remaining layer connected to the layer connected itself to the output ports being only constituted by power dividers.

According to a second aspect, the invention concerns a multiple beam antenna comprising at least: an array of M radiating elements; a beam forming network for feeding the array, said beam forming network being constituted by the device according to the first aspect of the invention.

In the multiple beam antenna of the second aspect of the invention, the array is chosen among the group consisting in: a circular array, a cylindrical array, a conical array or a planar array.

According to a third aspect, the invention concerns a steered beam antenna comprising at least: an array of M radiating elements; a beam forming network for feeding the array, said beam forming network being constituted by the device according to the first aspect of the invention having N inputs; a switch matrix to select at least one beam among the N beams available.

According to a fourth aspect, the invention concerns a steered beam antenna comprising at least: an array of M radiating elements; a beam forming network for feeding the array, said beam forming network being constituted by the device according to the first aspect of the invention having N inputs; a Butler or hybrid matrix associated to a row of variable phase shifters to select at least one beam among the N beams available.

When used to feed an array antenna, the device of the invention with the particular arrangement of power dividers and power combiners enables new coherently fed planar or circular array applications with new excitation laws characterized by similar overlaps in amplitude between adjacent distributed input signals.

It may be of interest in high definition telemetry applications with improved resolution for higher data rates.

It can also be of interest in telecommunication multiple beam applications and a convenient way to implement SDMA (Spatial Division Multiple Access) at antenna level.

BRIEF DESCRIPTION OF THE DRAWINGS

Other features and advantages of the invention will appear in the following description. Embodiments of the invention will be described with reference to the drawings, in which FIG. 1—already discussed—illustrates a multiple beam coherently radiating periodic structure as known;

FIG. 3 illustrates a BFN according to a second embodiment of the invention;

FIG. 4 illustrates an array that can be used with the BFN of FIG. 3;

FIG. 5 illustrates the amplitude distribution (dB) of the BFN of FIG. 3;

FIG. 9 illustrates the amplitude distribution (dB) of the BFN as illustrated in FIG. 7*a* extended to produce 5 beams;

DETAILED DESCRIPTION OF THE INVENTION

In the following we describe various embodiments of BFN according to the invention and operating in transmit. Obviously, each BFN could be used in receive, based on the reciprocity principle.

First Embodiment

Figure 2A:
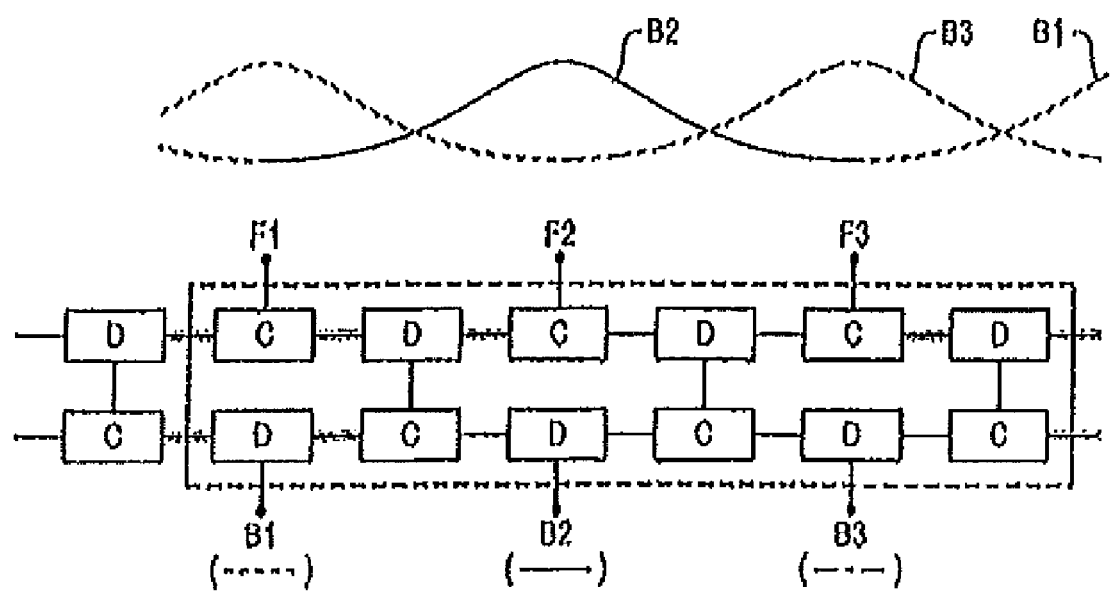
FIGS. 2*a* and 2*b* illustrate a BFN according to a first embodiment of the invention.
Figure 2B:
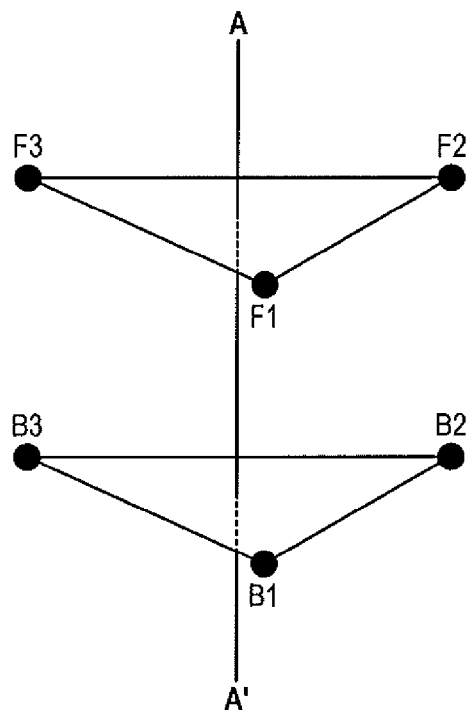

FIGS. 2*a* and 2*b* describe a BFN for distributing a plurality of microwave signals between radiating elements of an antenna, into coherent signals having a Gaussian amplitude distribution.

This BFN comprises N=3 input ports receiving N different input signals, M=3 output ports providing output signals and P=2 layers composed of an alternate arrangement of power dividers D and power combiners C.

In transmit the input ports $B_1$, $B_2$, $B_3$ are directly connected to power dividers D and the output ports $F_1$, $F_2$, $F_3$ are connected to power combiners C.

Figure 1:
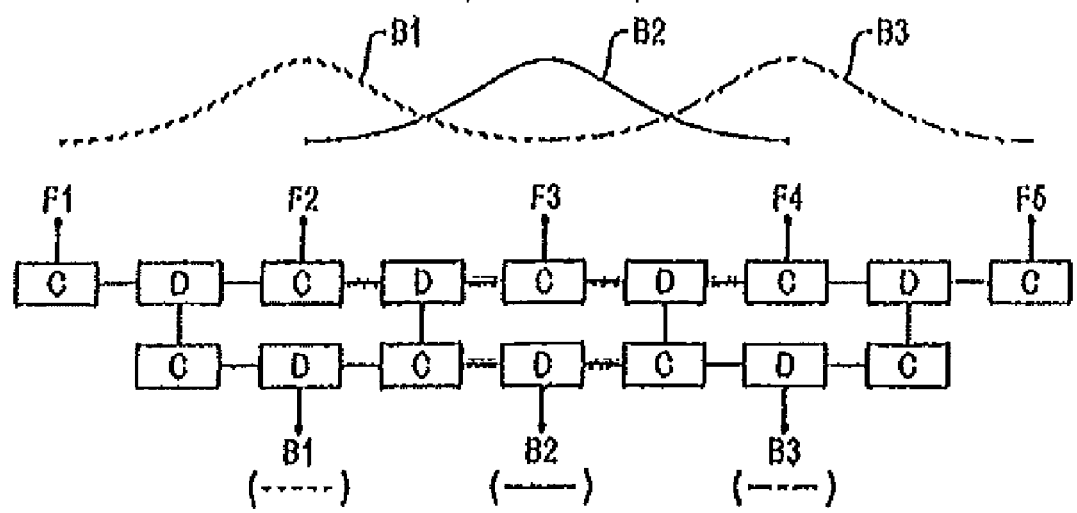

Comparing the BFN of FIG. 2*a* with the BFN of FIG. 1, one can note that the periodic arrangement of combiners C and power dividers D is closed.

In FIG. 2*a*, the closed shape BFN is enclosed in the dashed area. This BFN is closed in the sense that the left side of this dashed area is connected to the right side of this same dashed area. This is further illustrated in FIG. 2*a* by the highlighted electrical paths followed by the signal entering at input port $B_1$. The portions of signal reaching the left end side of the structure continue on the corresponding right side of the same layer.

This is also illustrated in FIG. 2*b* by the two polygonal closed shapes supporting respectively the input ports ($B_1$ to $B_3$) and the output ports ($F_1$ to $F_3$). For this specific embodiment, the arrangement of power combiners and/or power dividers is self similar with a rotation of $k2\pi/3$ around the axis AA', where k is an integer between 1 and 3.

Top of FIG. 2*a* illustrates the amplitude Gaussian like distributed input signals at the output ports.

All the signals have similar amplitude overlap as now beams $B_1$ and $B_3$ have similar amplitude overlap compared to other adjacent beams (see top of FIG. 1 for comparison).

The actual implementation of this structure will mainly depend on the selected technology.

If realised in printed technologies, like the usually planar microstrip BFNs, one may use a soft substrate that can be rolled in a cylindrical shape and then connect the corresponding electrical paths from left and right ends to close the structure.

If realised in waveguide technology, it is even simpler as the 3D design can be done using appropriate bends to close the structure while keeping similar electrical paths for each input. In this case, the closed shape is not necessarily a cylinder, but may be a more adapted closed polygonal shape, eventually to reduce the overall size of the structure or simplify manufacturing.

Second Embodiment

FIG. 3 illustrates a BFN for planar arrays that can be used in front of a reflector antenna. FIG. 4 illustrates the corresponding array that is implemented at the focal point of the reflector antenna.

This BFN comprises N=3 input ports $B_1$, $B_2$, $B_3$, M=6 output ports $F_1$, $F_2$, $F_3$, $F_4$, $F_5$, $F_6$ and P=4 layers.

The arrangement of the layers is different from the arrangement of the BFN of the FIG. 2 to illustrate the fact that the alternate arrangement of power combiners and power dividers needs sometimes to be broken while keeping the main rotational symmetry with an angle of $k2\pi/N$ characterising the invention.

In FIG. 3, three layers are constituted by an alternate arrangement of power dividers D and power combiners C (numbering layers from inputs to outputs, it is the layers 1, 2 and 4) and a layer (number 3) is only constituted by power dividers D directly connected to the upper layer without passing by power combiners C.

Consequently, this structure has two chained power dividers D, breaking the periodic alternate of power combiners and power dividers of the state-of-the-art arrangement.

As in state-of-the-art configuration, the input ports $B_1$, $B_2$, $B_3$ are connected to power combiners D and the output ports are connected to power combiners C.

FIG. 4 illustrates the array that can be implemented with the BFN of the second embodiment. Three interleaved beams need to be generated by the BFN resulting in shared feeds (the six central feeds named $F_1$ to $F_6$).

The proposed BFN according to the invention is only used for the shared feeds. A standard BFN based on parallel unbalanced power dividers has to be added to the invention to feed the complete arrangement of 12 feeds, including shared feeds and dedicated feeds per beam.

Among the six shared feeds, some feeds are shared by two beams (feeds $F_1$, $F_3$, $F_5$) and the others are common to the three beams (feeds $F_2$, $F_4$, $F_6$). The similarity in the shared sub-array elements directly links to the properties described above for the closed shape BFN, i.e. producing similar amplitude overlap for all the distributed input signals.

Advantageously, due to the small size of the closed shape BFN of the second embodiment, each input signal is distributed to all the output ports and even recombines at the extremities. For example, in the case of beam $B_2$, the extreme feed is $F_1$ and is reached by a signal travelling on the right direction and another one in the left direction. Due to this recombination, power level in this extreme opposite output port is similar to adjacent output ports.

Effective values produced by this topology are presented in the table of FIG. 5. The specific structure of the BFN is selected to ensure a central high power feed per beam ($F_2$ for beam $B_1$, $F_4$ for beam $B_2$ and $F_6$ for beam $B_3$) located at the centre of each 7-feed sub-array (one sub-array per beam). An almost balanced Gaussian like tapering is achieved with the proposed BFN but using 8 feeds instead of 7 (the two dedicated feeds per beam plus the six shared ones).

Figure 6:
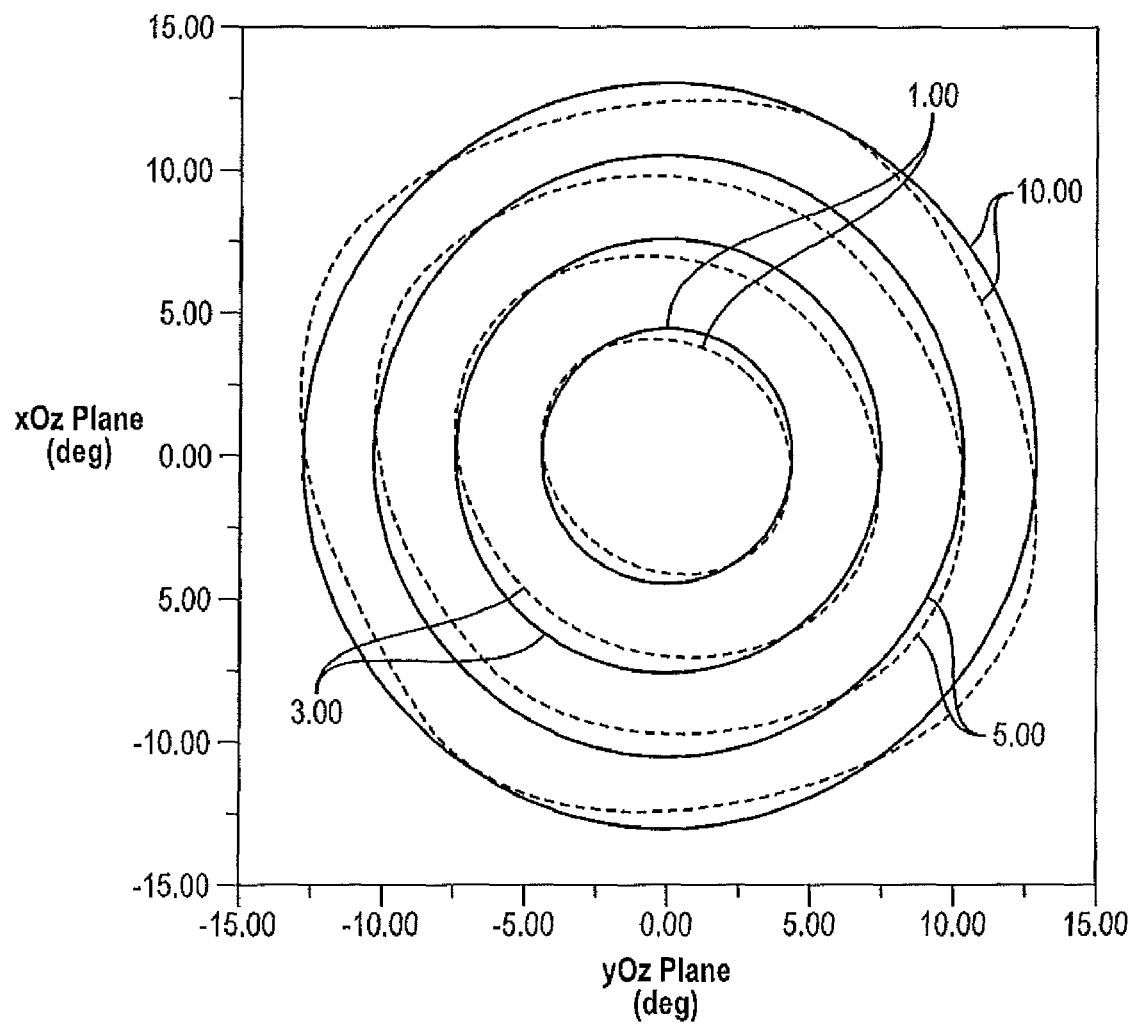
FIG. 6 illustrates the radiation pattern of the BFN of FIG. 3 (dashed lines) versus equi-amplitude BFN (solid lines)

FIG. 6 compares the radiation pattern produced by an equi-amplitude 7-feed sub-array (solid curves) to the radiation pattern produced by the proposed 8-feed sub-array (dashed curves). Very similar performances are achieved. The proposed BFN enables to replace a complex switching network required otherwise to alternate between the 3 interleaved beams. Eventually, the 3 beams can also be used simultaneously if they are in different frequency channels.

Third Embodiment

Figure 7B:
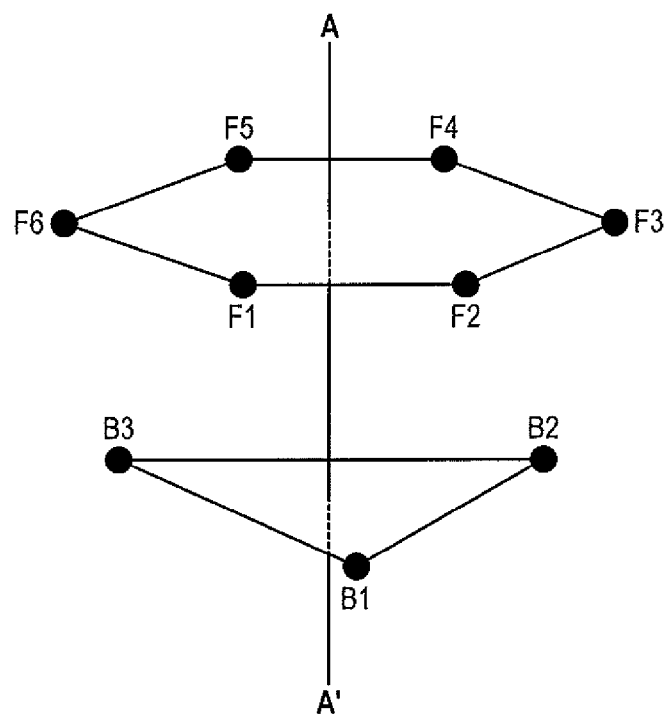
FIG. 7*a* and FIG. 7*b* illustrate a BFN according to a third embodiment of the invention.
Figures 7A, 8:
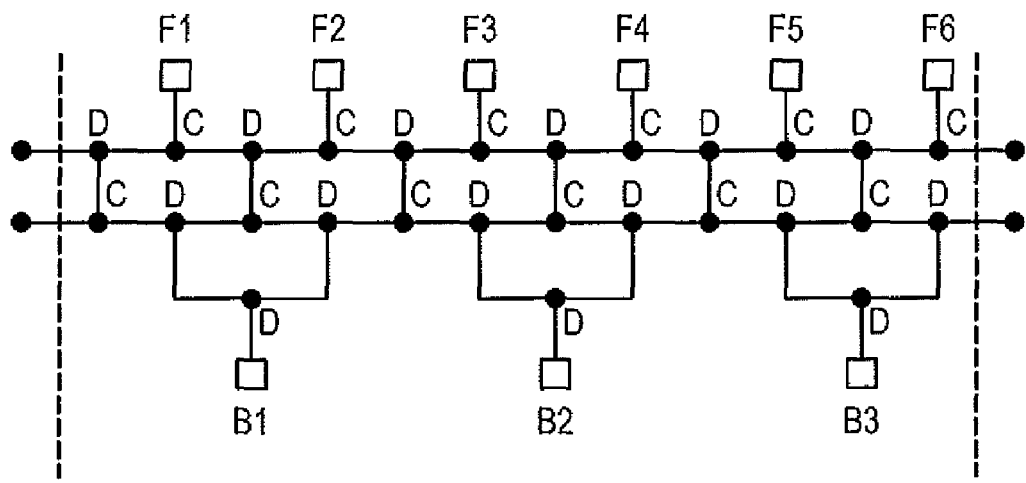
FIG. 8 illustrates the amplitude distribution (dB) of the BFN as illustrated in FIG. 7*a* and FIG. 7*b*.

FIGS. 7a and 7b illustrate a BFN according to the invention for circular, cylindrical or conical array antennas.

In this case of arrays, we may use a higher number of outputs. Compared to the state-of-the-art, where the signals have usually equal amplitude, the closed shape BFN will introduce the Gaussian like tapering that is particularly attractive to shape the beams and mainly reduce the side lobes.

The topology of the closed shape BFN is well matched to circular arrays and enables all the beams to be produced simultaneously if needed, as in typical SDMA (Spatial Division Multiple Access) implementation. This is often used to increase the capacity of telecommunication systems.

The BFN of FIG. 7a comprises N=3 input ports, M=6 output ports and P=3 layers.

The polygonal closed shape arrangements of the input ports ($B_1$ to $B_3$) and output ports ($F_1$ to $F_6$) are illustrated in FIG. 7b. For this specific embodiment, the arrangement of power combiners and/or power dividers is self similar with a rotation of $k2\pi/3$ around the axis AA', where k is an integer between 1 and 3.

As illustrated in FIG. 7a, two layers are constituted by an alternate arrangement of power dividers D and power combiners C (numbering from inputs to outputs, it is the layers 2 and 3) and a layer (number 1) is only constituted by power dividers D. The layer that is constituted by only power dividers is connected to the input ports $B_1$, $B_2$, $B_3$.

This BFN is able to produce 3 beams with a 6-element circular array.

Each input port $B_1$, $B_2$, $B_3$ transmits power towards 4 output ports, with some similar overlap between adjacent beams.

The corresponding amplitude distribution is reported in the table of FIG. 8. One point is particularly important in this solution when compared to the state-of-the-art: the topology starts with two cascaded power dividers before alternating power dividers and power combiners like in the state-of-the-art CORPS-BFN. This has a major impact on the BFN losses.

Multiple beams coherent BFNs are lossy due to non-orthogonal excitation laws. Interestingly, in a standard CORPS-BFN the main contribution to losses is at the first stage with the first alternate combination of power divider and power combiner.

To illustrate the radiated performances of an array fed by the BFN of the FIG. 7a it is preferable to increase the number of radiating elements, to increase at the same time the radius of the circular array.

Hence, we keep the topology described in FIG. 7, with the same number of layers (resulting in the same number of radiating elements per beam).

Increasing the number of radiating elements also enables to increase the number of beams as we keep the same ratio of 2 between the number of output ports and the number of input ports.

Figure 10:
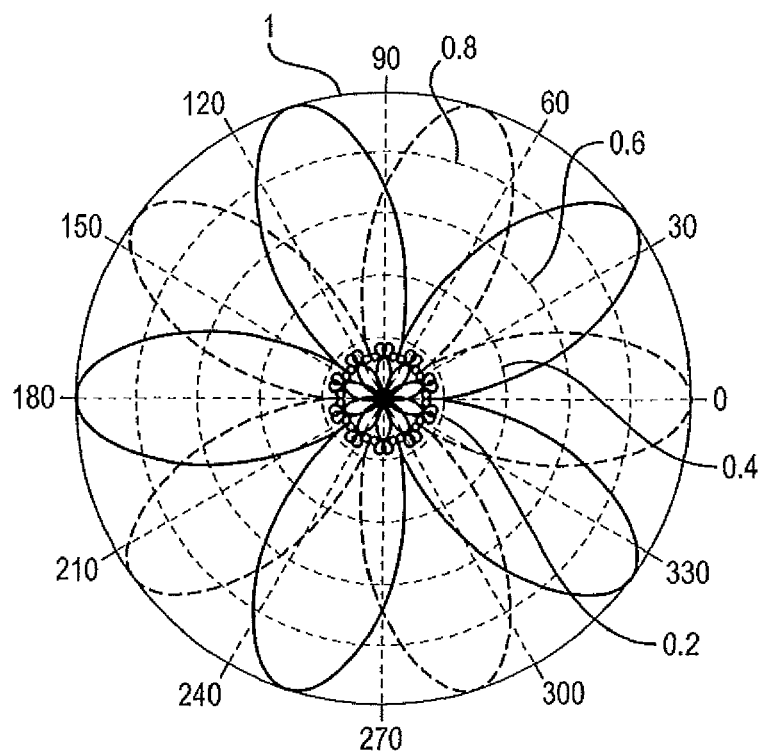
FIG. 10 illustrates the 10 beams produced by a 20-element circular array fed by the BFN of FIG. 7.
Figure 11:
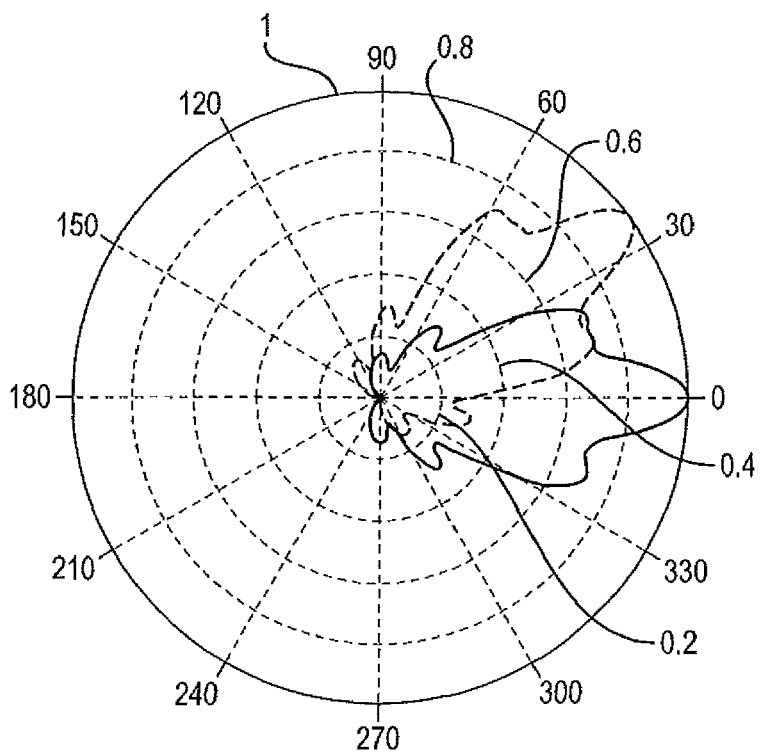
FIG. 11 illustrates beams produced by an equi-amplitude 4-element per beam circular array.

We illustrate in the table of FIG. 9 the possible amplitude distribution in the case of a closed shape BFN as described in FIG. 7a extended to produce 5 beams (leading to a 10-radiating element circular array). It can be extended in the same manner to larger arrays. To evaluate the radiating performances, we consider a 20-element circular array. The array spacing is little smaller than the wavelength (0.8λ). It enables to produce 10 beams with proper overlap. The beams produced by the proposed BFN are illustrated on FIG. 10. These patterns are given in field amplitude. An overlap or roll-off around −3 dB (0.7V) from the maximum directivity is found, corresponding to typical values in multiple beam antennas for SDMA implementations. Beams with same line style (solid or dashed) may use the same frequency bands. Consequently, with this solution the frequency plan can be reused 5 times, resulting in improved system capacity. FIG. 11 illustrates the pattern that would be produced by a similar array but with equi-amplitude and coherent distribution based on the state-of-the-art. Such a configuration usually requires additional phase control to shape the beam to better balance energy repartition and reduce side lobes.

Figure 12:
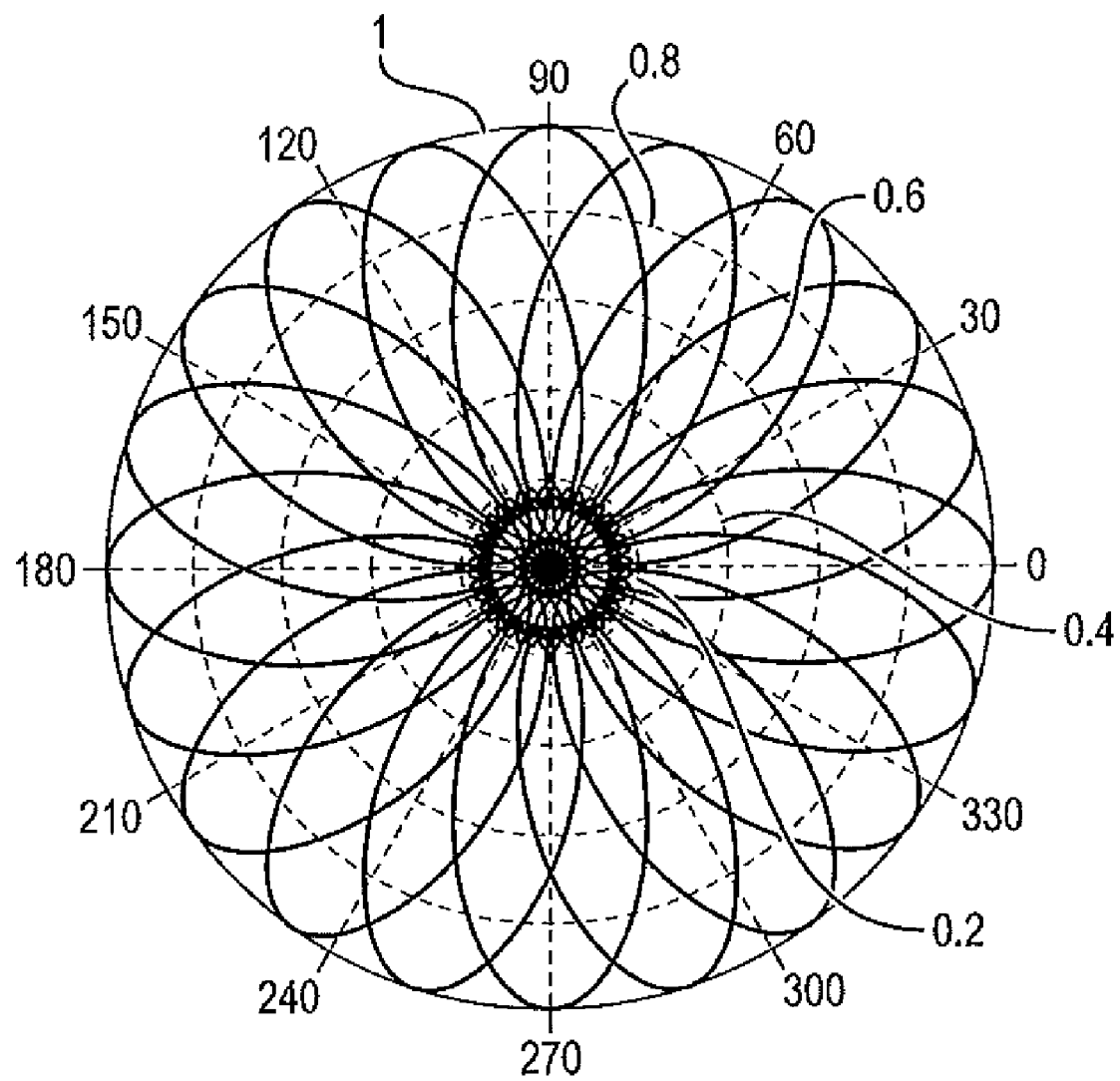
FIG. 12 illustrates the 20 beams produced by a 20-element circular array fed by a closed shape BFN for steered beam applications.

As mentioned, such an array fed circular array could be of interest for SDMA implementation. It can also be used for electronically steered beam application. In this case, the beam steering will be produced by a control section (based on switches or hybrid matrices with phase control as illustrated in the state of the art) that would select the proper beam at a given instant. For this reason, it may be of interest to keep all the beams that can be produced by a closed shape BFN with a standard alternate arrangement of power dividers and power combiners. As a consequence, the number of outputs and inputs are equal. Resulting beams are illustrated in FIG. 12. The azimuth angular resolution is obviously increased with a beam maximum every 18 degrees, and an overlap better than −1 dB under the maximum directivity.

Performances of the closed shape BFN were discussed in circular array applications, but it can be extended to cylindrical or conical arrays as the third dimension used has no impact on the azimuth patterns.

A standard BFN (planar) may be used to shape the beam in the elevation plane.

Also, the proposed networks were considered here as array feeding network applications, but they are obviously not limited to such applications.

They can be used more generally as a mean to modify an electromagnetic signal.

Another well-known application of such networks is distributed amplification in multiport amplifiers.

The invention claimed is:

1. A network for distributing a plurality of input microwave signals into a plurality of output signals having a Gaussian amplitude and in-phase distribution per each input signal, the network comprising:
   a plurality of N input ports providing N different input signals, wherein N is an integer;
   a plurality of M output ports, wherein M is an integer and a multiple of N; and
   a plurality of layers disposed between the input ports and the output ports, wherein the input signals are distributed through the layers, each layer comprising at least one of a plurality of power combiners and a plurality of power dividers,
   wherein the at least one of the plurality of power combiners and the plurality of power dividers are arranged in an angular rotational configuration of k2π/N radians around a symmetrical axis of a closed polygonal shape formed by the input ports, k being an integer between 1 and N.

2. A network according to claim 1 wherein each input port is connected to one of the plurality of power dividers and each output port is connected to one of the plurality of power combiners.

3. A network according to claim 1 wherein a first layer of the plurality of layers comprises a power divider and a second layer of the plurality of layers comprises a power combiner, the first layer being connected to the second layer such that the power divider of the first layer is connected to the power combiner of the second layer.

4. A network according to claim 1 comprising a first layer, a second layer, and a third layer,
   wherein the first layer is connected to the input ports and comprises only at least some of the plurality of power dividers,
   wherein the second layer and the third layer each comprise an alternating arrangement of at least some of the plurality of power combiners and at least some of the plurality of power dividers.

5. A network according to claim 1 comprising a first layer, a second layer, a third layer and a fourth layer,
   wherein the first layer is connected to the input ports, the second layer is connected to the output ports, the third layer is connected to the first layer, and the fourth layer is connected to the second layer,
   wherein the first layer, the second layer and the third layer each comprise an alternating arrangement of at least some of the plurality of power combiners and at least some of the plurality of power dividers, wherein the fourth layer is connected to the input ports and comprises only at least some of the plurality of power dividers.

6. A multiple beam antenna comprising:
   a plurality of M radiating elements configured in an array, wherein M is an integer;
   a beam forming network for feeding the array, wherein the beam forming network comprises:
   a plurality of N input ports providing N different input signals, wherein N is an integer;
   a plurality of M output ports, wherein M is a multiple of N; and
   a plurality of layers disposed between the input ports and the output ports, wherein the input signals are distributed through the layers, each layer comprising at least one of a plurality of power combiners and a plurality of power dividers,
   wherein the at least one of the plurality of power combiners and the plurality of power dividers are arranged in an angular rotational configuration of k2π/N radians around a symmetrical axis of a closed polygonal shape formed by the input ports, k being an integer between 1 and N.

7. A multiple beam antenna according to claim 6 wherein the array is selected from the group consisting of: a circular array, a cylindrical array, a conical array and a planar array.

8. A multiple beam antenna according to claim 6 wherein each input port is connected to one of the plurality of power dividers and each output port is connected to one of the plurality of power combiners.

9. A multiple beam antenna according to claim wherein a first layer of the plurality of layers comprises a power divider and a second layer of the plurality of layers comprises a power combiner, the first layer being connected to the second layer such that the power divider of the first layer is connected to the power combiner of the second layer.

10. A multiple beam antenna according to claim 6 comprising a first layer, a second layer, and a third layer,
   wherein the first layer is connected to the input ports and comprises only at least some of the plurality of power dividers,
   wherein the second layer and the third layer each comprise an alternating arrangement of at least some of the plurality of power combiners and at least some of the plurality of power dividers.

11. A multiple beam antenna according to claim 6 comprising a first layer, a second layer, a third layer and a fourth layer,
   wherein the first layer is connected to the input ports, the second layer is connected to the output ports, the third layer is connected to the first layer, and the fourth layer is connected to the second layer,
   wherein the first layer, the second layer and the third layer each comprise an alternating arrangement of at least some of the plurality of power combiners and at least some of the plurality of power dividers,
   wherein the fourth layer is connected to the input ports and comprises only at least some of the plurality of power dividers.

12. A steered beam antenna comprising:
   a plurality of M radiating elements configured in an array, wherein M is an integer;
   a beam forming network for feeding the array; and
   a matrix to select at least one beam output from the beam forming network,
   wherein the beam forming network comprises:
   a plurality of N input ports providing N different input signals, wherein N is an integer;
   a plurality of M output ports, wherein M is a multiple of N; and
   a plurality of layers disposed between the input ports and the output ports, wherein the input signals are distributed through the layers, each layer comprising at least one of a plurality of power combiners and a plurality of power dividers,
   wherein the at least one of the plurality of power combiners and the plurality of power dividers are arranged in an angular rotational configuration of $k2\pi/N$ radians around a symmetrical axis of a closed polygonal shape formed by the input ports, k being an integer between 1 and N.

13. A steered beam antenna according to claim 12 wherein the matrix is a switch matrix.

14. A steered beam antenna according to claim wherein the matrix is one of a Butler matrix and a hybrid matrix, wherein the matrix is associated with a row of variable phase shifters.

15. A steered beam antenna according to claim 12 wherein the array is selected from the group consisting of: a circular array, a cylindrical array, a conical array and a planar array.

16. A steered beam antenna according to claim 12 wherein each input port is connected to one of the plurality of power dividers and each output port is connected to one of the plurality of power combiners.

17. A steered beam antenna according to claim 12 wherein a first layer of the plurality of layers comprises a power divider and a second layer of the plurality of layers comprises a power combiner, the first layer being connected to the second layer such that the power divider of the first layer is connected to the power combiner of the second layer.

18. A steered beam antenna according to claim 12 comprising a first layer, a second layer, and a third layer,
   wherein the first layer is connected to the input ports and comprises only at least some of the plurality of power dividers,
   wherein the second layer and the third layer each comprise an alternating arrangement of at least some of the plurality of power combiners and at least some of the plurality of power dividers.

19. A steered beam antenna according to claim 12 comprising a first layer, a second layer, a third layer and a fourth layer,
   wherein the first layer is connected to the input ports, the second layer is connected to the output ports, the third layer is connected to the first layer, and the fourth layer is connected to the second layer,
   wherein the first layer, the second layer and the third layer each comprise an alternating arrangement of at least some of the plurality of power combiners and at least some of the plurality of power dividers,
   wherein the fourth layer is connected to the input ports and comprises only at least some of the plurality of power dividers.

* * * * *

UNITED STATES PATENT AND TRADEMARK OFFICE
CERTIFICATE OF CORRECTION

| | |
|---|---|
| PATENT NO. | : 8,384,594 B2 |
| APPLICATION NO. | : 12/851859 |
| DATED | : February 26, 2013 |
| INVENTOR(S) | : Nelson Fonseca |

It is certified that error appears in the above-identified patent and that said Letters Patent is hereby corrected as shown below:

In the Claims

Column 8, line 64, "according to claim" should read --according to claim 6--
Column 10, line 6, "according to claim" should read --according to claim 12--

Signed and Sealed this
Thirtieth Day of July, 2013

Teresa Stanek Rea
*Acting Director of the United States Patent and Trademark Office*